Patented Jan. 29, 1946

2,393,826

UNITED STATES PATENT OFFICE 2,393,826

1,3,7-TRIAZABICYCLO [3.3.0] OCTANES

Murray Senkus, Terre Haute, Ind., assignor to Commercial Solvents Corporation, Terre Haute, Ind., a corporation of Maryland No Drawing. Application February 28, 1944, Serial No. 524,285

12 Claims. (Cl. 260—309)

My invention relates to a new class of chemical compounds and to a process for preparing the same. More particularly it relates to 1,3,7-triazabicyclo [3.3.0] octanes, having the following general structural formula:

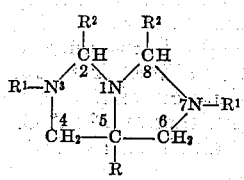

wherein R represents hydrogen, alkyl, aryl, cycloaliphatic or heterocyclic; $R^1$ may be either hydrogen, alkyl, aryl, heterocyclic, cycloaliphatic, or aralkyl; and $R^2$ may be hydrogen, alkyl, aryl, aralkyl or heterocyclic.

Typical compounds included by the above generic formula are 5-methyl-3,7-diisopropyl-1,3,7-triazabicyclo [3.3.0] octane, 5-phenyl-3,7-dicyclohexyl-1,3,7-triazabicyclo [3.3.0] octane, 5-methyl-3,7-diisopropyl-2,8-bis(1-ethylpentyl)-1,3,7-triazabicyclo [3.3.0] octane, 5-ethyl-3,7-dibenzyl-2,8-diphenyl-1,3,7-triazabicyclo [3.3.0] octane, 5-methyl-3,7-diisopropyl-2,8-difurfuryl-1,3,7-triazabicyclo [3.3.0] octane, 5-cyclohexyl-3,7-ditetrahydrofurfuryl-1,3,7-triazabicyclo [3.3.0] octane, 5-methyl-3,7-diphenyl-1,3,7-triazabicyclo [3.3.0] octane, 5-methyl-3,7-diisopropyl-2,8-diphenyl-1,3,7-triazabicyclo [3.3.0] octane, and the like.

Reactions between carbonyl and polyamino compounds are well known, however, all of such reactions of which I am aware, prior to the present invention, have yielded only polymeric materials. I have now discovered that a new class of chemical compounds; to-wit, 1,3,7-triazabicyclo [3.3.0] octanes can be synthesized by reacting an aldehyde with a triamine having the three amino groups attached to adjacent carbon atoms.

In preparing such compounds, it is generally preferable to react the aldehyde with a suitable triamine in a ratio of two moles of aldehyde to one of triamine. Also, it is desirable to employ a water-immiscible liquid such as toluene, benzene, xylene or their equivalent as a solvent for the reaction and to assist in the removal of water produced by the reaction. During the formation of the 1,3,7-triazabicyclo [3.3.0] octane, water is observed to collect rather rapidly in the distillate, however, when the rate of water formation decreases such is an indication that the reaction is substantially complete. The solvent and other more volatile impurities present are then distilled off at atmospheric pressure and the residue, if liquid, is subjected to further fractionation under reduced pressure. The 1,3,7-triazabicyclo [3.3.0] octanes which are solids may be further purified by recrystallization from benzene, petroleum ether, or similar solvents.

The procedure as above described is subject to several modifications and in certain instances such variations are highly desirable. For example, if an aldehyde is employed that is substantially insoluble in water an excess can be advantageously used as a means for removing the water produced by the condensation of triamine with the aldehyde. A large excess of the latter is not necessary since it can be continuously separated from the distillate and returned to the reaction mixture. Another advantage of using the aldehyde in amounts which exceed combining proportions resides in the fact that the reaction involved is reversible and the presence of an excess of aldehyde tends to drive the reaction to completion in the desired direction. Frequently, when a relatively high-boiling aldehyde is used, it is desirable to add to the reaction mixture from 25 to 50% of benzene, toluene, or similar substance, based on the excess of aldehyde present, in order to reduce the boiling point of the reaction mixture to a temperature that does not deleteriously affect the formation of the desired 1,3,7-triazabicyclo [3.3.0] octane.

The triamines employed in carrying out my invention constitute a wide range of compounds and may be represented by the following generic formula in which the substituent R may be either alkyl, aryl, hydrogen, or cycloaliphatic; and $R^1$ represents hydrogen, alkyl, cycloaliphatic, aryl, aralkyl or heterocyclic:

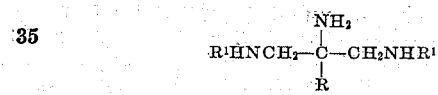

Typical examples of triamines included by the above formula are 1,2,3-propanetriamine, 2-amino-2-methyl-1,3-propanebisphenylamine, 5-amino-2,5,8-trimethyl-3,7-diazanonane, 5-amino-5-phenyl-2,8-dimethyl-3,7-diazanonane, 2-amino-2-methyl-1,3-propanebiscyclohexylamine, 2-amino-2-ethyl-1,3-propanebisfurfurylamine, 2-amino-2-cyclohexyl-1,3-propanebistetrahydrofurfurylamine, 2-phenyl-1,2,3-propanetriamine, and the like. Triamines containing three primary amino groups may be synthesized by reacting liquid ammonia with the required 1,2,3-trihaloalkane under pressure in a known manner. Triamines having a primary amino group on the central carbon atom and secondary amino groups on either side thereof are preferably synthesized in accordance with the procedure described in my copending application, U. S. Serial No. 455,932 filed August 24, 1942. By the procedure there described, the desired nitro amine is subjected to liquid phase hydrogenation in the presence of a suitable hydrogenation catalyst such as, for example, Raney nickel. A solvent such as methanol or ethanol is preferably employed. Hydrogenation of the nitroamine is effected at pressures in the neighborhood of 500 lbs. per square inch and at temperatures of about 35° C. After hydrogen adsorption is complete, the triamine can be isolated from the reduction mixture in a known manner.

The nitroamine employed as a starting material for the preparation of such triamines may be synthesized in accordance with the procedure described in my copending application U. S. Serial No. 482,756 filed April 12, 1943. By this procedure, a primary aliphatic amine is reacted with formaldehyde to form the corresponding N-hydroxymethyl monoalkylamine which is in turn reacted with an equimolecular quantity of a primary nitroparaffin to produce the desired nitroamine.

An exception to the procedure described immediately above is encountered in instances where it is desired to synthesize triamines of the above general type from primary aromatic amines and primary nitroparaffins. The procedure preferably employed in the latter case is suitably described in co-pending application, U. S. Serial No. 473,523 filed January 25, 1943, by Harold G. Johnson. By this procedure, a primary aromatic amine is reacted with a suitable dihydric primary nitro alcohol in the presence of a basic catalyst such as, for example, sodium hydroxide, tributylamine, triethylamine, trimethylbenzylammonium hydroxide, or the like, at a temperature of approximately 50° C. The nitroamine thus produced can then be subjected to hydrogenation in accordance with the general procedure outlined above.

As examples of aldehydes that may be employed in carrying out my invention, there may be mentioned formaldehyde, butyraldehyde, isobutyraldehyde, 2-ethylhexaldehyde, benzaldehyde, phenylacetaldehyde, p-tolualdehyde, furfural, and the like.

The examples which follow are illustrative of the various types of 1,3,7-triazabicyclo [3.3.0] octanes that come within the scope of my invention. They are likewise illustrative of the procedure whereby these new chemical compounds may be synthesized. However, it is to be specifically understood that such examples in no way limit the scope of my invention with respect to either the product or process demonstrated therein, since I have found that the reaction involved is very general in character and will occur under the conditions set forth when reacting substantially any triamine of the class described with an aldehyde of the various types enumerated above.

Example I

A mixture consisting of 75 ml. of 36% aqueous formaldehyde, 94 g. of 5-amino-2,5,8-trimethyl-3,7-diazanonane having the structure

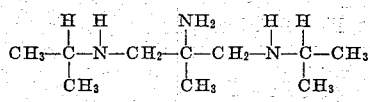

and 200 ml. of benzene was refluxed in a flask connected to a suitable condenser and moisture trap. After water ceased to separate in the moisture trap, the residue was distilled through an efficient fractionating column at atmospheric pressure until the major portion of the benzene had been removed. Further rectification was then carried out under reduced pressure and as a result there was obtained 5-methyl-3,7-diisopropyl-1,3,7-triazabicyclo [3.3.0] octane, boiling at 86.0–86.5 (3 mm.), in a conversion of 82% of theory. This compound was a colorless mobile liquid and possessed a faint pyridine-like odor. It was soluble in acetone, methanol, benzene, ethyl ether, and petroleum ether. It dissolved in water with considerable evolution of heat.

Analysis: Calculated for $C_{12}H_{25}N_3$: N, 19.90. Found: 19.76. $n_D^{20}$, 1.4662;

$$d_{20}^{20}, 0.9111$$

Example II

5 - methyl - 3,7 - diphenyl - 1,3,7 - triazabicyclo [3.3.0] octane was prepared by gently distilling a mixture consisting of 26.5 g. of 2-amino-2-methyl-N,N'-diphenyl-1,3-propanediamine, 14 ml. of 36% aqueous formaldehyde, and 100 ml. of benzene until the removal of water from the reaction mixture substantially ceased. The residue thus obtained was placed on a steam bath and the benzene removed therefrom under reduced pressure. The product in the reaction vessel was a solid and amounted to 31 g. This crude 5-methyl-3,7-diphenyl-1,3,7-triazabicyclo [3.3.0] octane was next recrystallized from 100 ml. of cyclohexane. A white crystalline product amounting to 23 g. and melting at 122.1° C. was recovered.

Analysis: Calculated for $C_{18}H_{21}N_3$: N, 15.05. Found: 14.84.

Example III

A mixture consisting of 102 g. of 5-amino-2,5,8-trimethyl-3,7-diazanonane, 118 g. of benzaldehyde, and 150 ml. of toluene was refluxed for a period of approximately two hours, during which time 18.5 ml. of water was removed from the reaction mixture. Thereafter, the toluene was distilled off at a pressure of 100 mm. yielding a solid residue which was recrystallized from a mixture consisting of 150 ml. of benzene and 50 ml. of methanol. The 5-methyl-3,7-di-isopropyl-2,8-diphenyl-1,3,7-triazabicyclo [3.3.0] octane thus produced amounted to 176 g. This product was further purified by recrystallizing once from 150 ml. of benzene giving 73 g. of a white crystalline product melting at 65° C Analysis: Calculated for $C_{24}H_{33}N_3$: N, 11.57. Found: N, 11.47.

Example IV

A mixture consisting of 35 g. of 5-amino-2,5,8-trimethyl-3,7-diazanonane, and 2-ethylhexaldehyde in an amount corresponding to approximately 100% excess of that theoretically required to completely combine with the aforesaid triamine, was heated to reflux temperature and the water formed during the condensation removed with the 2-ethylhexaldehyde as a constant-boiling mixture. When observable amounts of water ceased to come over into the distillate, the residue was distilled under vacuum to remove the excess 2-ethylhexaldehyde and the desired 5-methyl-3,7-diisopropyl-2,8-bis (1-ethylpentyl)-1,3,7-triazabicyclo [3.3.0] octane boiling at 173° C. (0.9 mm.) was collected. The liquid product thus obtained amounted to 33 g.

Analysis: Calculated for $C_{26}H_{53}N_3$: N, 10.3. Found: N, 10.10. $n_D^{20}$, 1.4726;

$$d_{20}^{20}, 0.8903$$

The 1,3,7-triazabicyclo [3.3.0] octanes of my invention will be found useful in the synthesis of numerous novel and valuable compounds. Other uses of these new materials will readily occur to those skilled in the art. Likewise, it will be apparent to those familiar with the art to which the present invention is directed, that the procedure for the preparation of the 1,3,7-triazabicyclo [3.3.0] octanes as described above may be modified in numerous respects without departing from the scope of my invention. For example, the water produced by the condensation of the aldehyde with triamine need not necessarily be eliminated from the zone of reaction by means of a constant-boiling mixture with a liquid capable of forming an azeotrope therewith, but on the contrary, such water may be removed satisfactorily by employing a suitable inert dehydrating agent in the reaction mixture. Other modifications and equivalents will be apparent to those skilled in the art, however, it is to be strictly understood that any such modifications or equivalents are to be construed as lying within the scope of my invention.

My invention now having been described, what I claim is:

1. In a process for the synthesis of 1,3,7-triazabicyclo [3.3.0] octanes having the following structure

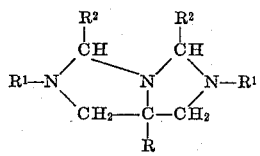

wherein R is a member selected from the group consisting of hydrogen, alkyl, aryl, cycloaliphatic and heterocyclic radicals; R¹ is a member selected from the group consisting of hydrogen, alkyl, aryl, heterocyclic, cycloaliphatic and aralkyl radicals; and R² is a member selected from the group consisting of hydrogen, alkyl, aryl, aralkyl and heterocyclic radicals, the step which comprises reacting an aldehyde with a triamine wherein the amino groups of said triamine are attached to adjacent carbon atoms and having the following general formula

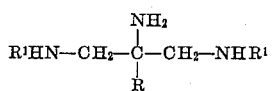

wherein the R substituents are as above described.

2. In a process for the synthesis of 1,3,7-triazabicyclo [3.3.0] octanes having the following structure

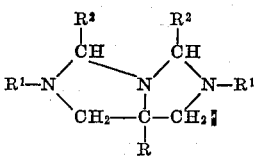

wherein R is a member selected from the group consisting of hydrogen, alkyl, aryl, cycloaliphatic and heterocyclic radicals; R¹ is a member selected from the group consisting of hydrogen, alkyl, aryl, heterocyclic, cycloaliphatic and aralkyl radicals; and R² is a member selected from the group consisting of hydrogen, alkyl, aryl, aralkyl and heterocyclic radicals, the step which comprises condensing an aldehyde with a triamine wherein the amino groups of said triamine are attached to adjacent carbon atoms and having the following general formula

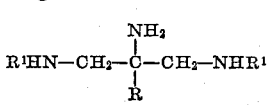

wherein the R substituents are as above described, and removing the water produced by such condensation substantially as it is formed.

3. The process of claim 1 in which the aldehyde is formaldehyde.

4. The process of claim 1 in which the aldehyde is benzaldehyde.

5. The process of claim 1 in which the aldehyde is 2-ethylhexaldehyde.

6. In a process for the synthesis of 5-methyl-3,7-diisopropyl-1,3,7-triazabicyclo [3.3.0] octane, the step which comprises condensing formaldehyde with 5-amino-2,5,8-trimethyl-3,7-diazanonane, and removing the water produced by such condensation substantially as it is formed.

7. In a process for the synthesis of 5-methyl-3,7-diisopropyl-2,8-bis(1-ethylpentyl)-1,3,7-triazabicyclo [3.3.0] octane, the step which comprises condensing 2-ethylhexaldehyde with 5-amino-2,5,8-trimethyl-3,7-diazanonane, and removing the water produced by such condensation substantially as it is formed.

8. In a process for the synthesis of 5-methyl-3,7-diphenyl-1,3,7-triazabicyclo [3.3.0] octane, the step which comprises reacting formaldehyde with 2-amino-2-methyl-1,3-propanebisphenylamine, and removing the water produced by such condensation substantially as it is formed.

9. As new compositions of matter, 1,3,7-triazabicyclo [3.3.0] octanes having the following general formula

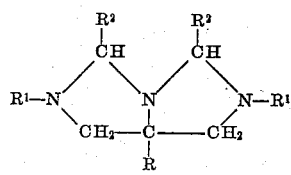

wherein R is a member selected from the group consisting of hydrogen, alkyl, aryl, cycloaliphatic and heterocyclic radicals; R¹ is a member selected from the group consisting of hydrogen, alkyl, aryl, heterocyclic, cycloaliphaic and aralkyl radicals; and R² is a member selected from the group consisting of hydrogen, alkyl, aryl, aralkyl and heterocyclic radicals.

10. 5-methyl-3,7-diisopropyl-1,3,7-triazabicyclo [3.3.0] octane having the following structure

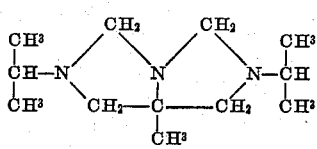

11. 5-methyl-3,7-diphenyl-1,3,7-triazabicyclo [3.3.0] octane having the following structure

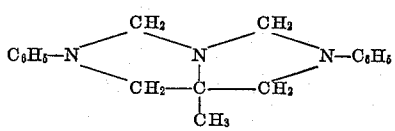

12. 5-methyl-3,7-diisopropyl-2,8-bis(1-ethylpentyl)-1,3,7-triazabicyclo [3.3.0] octane having the following structure

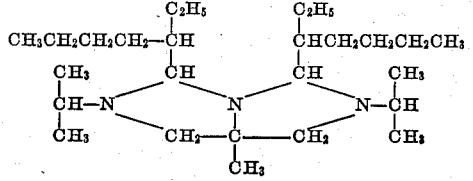

MURRAY SENKUS.